Patented June 26, 1951

2,557,985

UNITED STATES PATENT OFFICE 2,557,985

GUANIDINE FROM UREA AND CARBON DISULFIDE

Nat H. Marsh, Noroton Heights, Conn., assignor to American Cyanamid Company, New York, N. Y., a corporation of Maine No Drawing. Application March 31, 1949,
Serial No. 84,743

3 Claims. (Cl. 260—564)

The present invention relates to the preparation of guanidine values.

In the past various attempts have been made to prepare guanidine values directly from urea, but without conspicuous success. It has now been found that if urea is heated in an autoclave with carbon disulfide, guanidine is formed as the thiocyanate and may be recovered directly as the thiocyanate or converted to other salts.

It is an object of this invention, therefore, to prepare guanidine values from raw materials hitherto believed unsatisfactory as a source of guanidine values. It is a further object to prepare guanidine values from inexpensive raw materials. It is a still further object to prepare guanidine values by the reaction of carbon disulfide and urea in an autoclave. Still further objects will appear from the following description of the invention.

In general, any proportion of urea and carbon disulfide may be reacted with some yield of guanidine values. The temperature range contemplated is approximately 190°–450° C. The time of reaction will depend upon the temperature and will vary from 5 hours or more at 190° C. to 0.1 hour, or more at 450° C.

The following examples illustrate but do not limit the invention.

Example 1

0.49 mole of urea and 0.249 mole of carbon disulfide are heated in an autoclave for 5 hours at 350° C. At the end of the reaction period the autoclave is cooled, vented, and the reaction mass is scraped into a small volume of water, about 50 cc. Guanidine thiocyanate and other soluble materials dissolve, leaving behind various insolubles which are filtered off. The filtrate comprises essentially aqueous solutions of guanidine thiocyanate and ammonium thiocyanate. Guanidine may be recovered from the solution by means old in the art, such as the addition of an ion which forms a sparingly soluble guanidine salt. Thus, ammonium nitrate may be added to precipitate guanidine nitrate and the latter salt may be recovered by filtration. The yield of guanidine, calculated as the thiocyanate, was 24.6%.

Example 2

0.49 mole of urea and 0.249 mole of carbon disulfide are heated in an autoclave for 4 hours at 220° C., and the resulting guanidine thiocyanate so-formed converted to the picrate in a procedure analogous to that of Example 1. Yield, 14.2% of theoretical.

It is known that urea may be heated under pressure to yield melamine, and that melamine in the presence of an ammonium salt (but only in the presence of such salt) may then be heated to form a guanidine salt. However, the inventor is unable to explain how urea may be heated directly to form a guanidine salt since no ammonium salt is initially present. A possible explanation of the reaction mechanism is that the carbon disulfide decomposes some of the urea to form a sufficient amount of an ammonium salt to convert melamine molecules, formed as an intermediate, into the final guanidine product. However, this is only a hypothesis and the inventor does not wish to be bound by any theory of the reaction. It suffices to say that when urea and carbon disulfide are heated in a closed reaction zone to a temperature within the range 190°–450° C., guanidine values are formed.

The isolation of the guanidine thiocyanate may be effected by any of the conventional means, such as by cooling or evaporating an aqueous solution to cause crystallization, or by adding a water-miscible organic liquid, such as ethanol, to decrease the solubility of the salt and cause its precipitation. The guanidine molecule being that desired, said guanidine values can also be isolated by forming a less soluble salt, such as a picrate, a carbonate, nitrate, or a phosphate. The preparation of such less soluble salts is effected by simply adding an equivalent amount of the corresponding ammonium or metal salt of the acid to the aqueous solution of the thiocyanate, and inducing crystallization by any conventional means, such as those above mentioned. A preferred method of recovery is to add ammonium nitrate to an aqueous solution of guanidine thiocyanate, thereby precipitating the less soluble guanidine nitrate.

While the invention has been described with particular reference to specific embodiments, it is to be understood that it is not to be limited thereto but is to be construed broadly and restricted solely by the scope of the appened claims.

I claim:

1. The method of preparing guanidine thiocyanate comprising subjecting urea to the action of carbon disulfide in a closed reaction zone within the temperature range 190°–450° C. under the autogenously developed pressure, and recovering the thus-formed guanidine thiocyanate.

2. The method of preparing guanidine thiocyanate comprising subjecting urea to the action of carbon disulfide in a closed reaction zone within the temperature range 190°–450° C. under the autogenously developed pressure, and recovering the thus-formed guanidine thiocyanate.

3. The method comprising heating urea and carbon disulfide in an autoclave for about 5 hours at about 350° C., whereby guanidine thiocyanate is formed, and recovering the thus-formed guanidine thiocyanate.

NAT H. MARSH.

No references cited.